Dec. 16, 1958        C. A. CRAFTS ET AL        2,864,983
                         MOTOR DRIVE SYSTEM
                        Filed Nov. 29, 1955
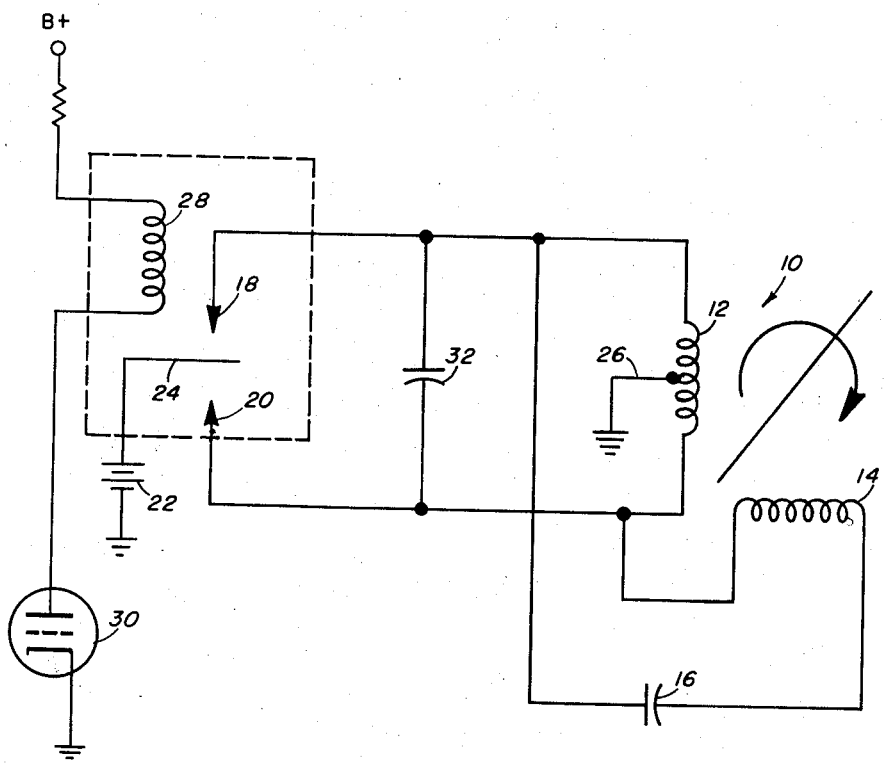
INVENTORS
C. A. CRAFTS
BY  FRANKLIN PAGE, JR.
George Z. Pearson
ATTORNEYS

United States Patent Office 2,864,983
Patented Dec. 16, 1958

2,864,983

MOTOR DRIVE SYSTEM

Cecil A. Crafts, Pasadena, and Franklin Page, Jr., Arcadia, Calif., assignors, by mesne assignments, to the United States of America as represented by the Secretary of the Navy Application November 29, 1955, Serial No. 549,901

1 Claim. (Cl. 318—171)

This invention relates to motor drive systems and more particularly to circuitry for coupling a synchronizing driving signal with an electric motor.

For coupling an electric motor with a fluctuating current supplied by a vacuum tube amplifier, it is customary to utilize a transformer between the motor and the amplifier. Such transformers are relatively heavy, expensive, and introduce a decrease in overall efficiency.

In portable equipment, such as lightweight facsimile apparatus designed to be used in the field, it has been found that scanner and recorder motors may be satisfactorily driven by the circuitry of this invention which eliminates the coupling transformer. The driving system of the present invention comprises a polyphase electric motor which is operated from a source of fixed potential. A tuned reed vibrator, driven from the output of a vacuum tube amplifier, couples the fixed potential to the motor to supply the latter with a modified square wave at the frequency of the amplifier output. Thus the transformer and most of its weight is eliminated. As there is a negligible voltage drop in the vibrator, the overall efficiency of the system is limited only by the efficiency of the motor itself.

It is an object of this invention to provide an improved motor drive system.

A further object of this invention is to provide a light weight means for coupling a synchronous motor with the driving signal therefor.

Another object of this invention is to eliminate the coupling transformer from a vacuum tube motor driving circuit.

A still further object of this invention is the provision of a motor drive system in which the efficiency is limited only by the efficiency of the motor itself.

Other objects and many of the attendant advantages of this invention will be readily appreciated as the same becomes better understood by reference to the following detailed description when considered in connection with the accompanying drawing which schematically illustrates a preferred form of the motor drive system of this invention.

A split phase synchronous motor 10 has a field which comprises a center tapped main winding 12 and an auxiliary winding 14 which is angularly related in space to the main winding. One end of winding 12 is connected to one end of winding 14 and a phase shift capacitor 16 is connected between the other ends of both windings. A tuned reed vibrator has a pair of stationary contacts 18, 20 connected to respective ends of winding 12. A source of fixed potential 22 is coupled between the movable contact 24 of the vibrator and the center tap 26 of winding 12. Vibrator driving coil 28 is series connected between the plate of vacuum tube driving amplifier 30 and the plate supply thereof.

The grid of amplifier tube 30 is fed with a synchronizing signal of a predetermined frequency which governs the motor speed. For optimum precision of operation there is chosen a vibrator having a natural frequency equal to this predetermined frequency which may be, for example, 60 cycles per second. The fluctuating current produced in the plate circuit of the tube by the synchronizing signal flows through coil 28 to produce a varying magnetic field. This field causes element 24 to alternately connect contacts 18, 20 with voltage source 22. Thus the vibrator contacts produce a signal of approximately square wave shape which is somewhat modified by the filter capacitor 32 connected across the winding 12. This wave shape has been found to be quite satisfactory in certain applications such as the facsimile apparatus mentioned above. This square wave has a frequency equal to the frequency of the driving signal and appears in both of windings 12, 14, being phase shifted in the latter by capacitor 16. The rotor of the motor is thereby driven by a polyphase field at a speed controlled by the vacuum tube 30.

Obviously many modifications and variations of the present invention are possible in the light of the above teachings. It is therefore to be understood that within the scope of the appended claims the invention may be practiced otherwise than as specifically described.

What is claimed is:

A drive system comprising a split phase synchronous motor having a main winding and an auxiliary winding, means connecting one end of said main winding to one end of said auxiliary winding, a phase shift capacitor connected between the other ends of both windings, a center tap on said main winding, a source of fixed potential having one side thereof connected to said center tap, a tuned reed vibrator having a movable contact connected to the other side of said source and having a pair of fixed contacts respectively connected to opposite ends of said main winding, a filter capacitor connected across the ends of said main winding, coil means for driving said movable contact, and means for feeding to said coil a current cyclically fluctuating at the natural frequency of said vibrator, said feeding means comprising an electronic tube driver having a plate circuit in series connection with said coil means and a grid circuit in connection with a signal source having a predetermined frequency equal to the natural frequency of said vibrator.

References Cited in the file of this patent

UNITED STATES PATENTS

| 1,563,727 | Curtis | Dec. 1, 1925 |
| 2,439,065 | Stewart | Apr. 6, 1948 |
| 2,617,083 | Petroff | Nov. 4, 1952 |

FOREIGN PATENTS

| 624,431 | France | Apr. 9, 1927 |